(12) United States Patent
Wilkin et al.

(10) Patent No.: US 7,515,378 B1
(45) Date of Patent: Apr. 7, 2009

(54) CUSTOMER EXPANDABLE MODULAR RACK MOUNT LIBRARY USING EXPANSION MODULE UNITS HAVING FEATURES TO JOIN ACCESS DOORS AND ALIGN COMPONENTS BETWEEN UNITS

(75) Inventors: Bradley A. Wilkin, Superior, CO (US); Daniel J. Plutt, Superior, CO (US); Joseph P. Manes, Arvada, CO (US); Donald R. Manes, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 534 days.

(21) Appl. No.: 11/210,426

(22) Filed: Aug. 24, 2005

Related U.S. Application Data

(60) Provisional application No. 60/638,772, filed on Dec. 22, 2004.

(51) Int. Cl.
*G11B 15/68* (2006.01)
(52) U.S. Cl. .................................. 360/92.1; 369/30.39
(58) Field of Classification Search ................ 360/92.1; 700/245; 369/30.39, 30.49, 30.51, 30.61
See application file for complete search history.

(56) References Cited

U.S. PATENT DOCUMENTS

| | | | | |
|---|---|---|---|---|
| 5,870,245 A | * | 2/1999 | Kersey et al. ............... | 360/92.1 |
| 5,940,356 A | * | 8/1999 | Toumbas ................. | 369/30.39 |
| 6,473,371 B1 | * | 10/2002 | White ..................... | 369/30.72 |
| 6,515,822 B1 | * | 2/2003 | White et al. ............... | 360/92.1 |
| 7,230,791 B1 | * | 6/2007 | Ostwald et al. ............ | 360/92.1 |
| 2002/0101685 A1 | * | 8/2002 | Taki et al. .................... | 360/134 |
| 2004/0056568 A1 | * | 3/2004 | Carlson et al. ........... | 312/223.1 |

OTHER PUBLICATIONS

Tape Library Twenty Slot to Forty Slot Upgrade Kit, Modular Scalability Guide for Library Models 2/20, 4/40, 6/60 and 6/140, Edition 2, Jun. 2000.

* cited by examiner

*Primary Examiner*—A. J. Heinz
(74) *Attorney, Agent, or Firm*—Brooks Kushman P.C.

(57) ABSTRACT

An expandable storage library for storing digital storage media, such as storage tapes or disks is provided. The library includes a base unit and robotic system to which additional expansion units may be added. Several expansion units may be installed in the library with the base unit so that the robotic system can access media storage racks in any of the expansion units or in the base unit. Doors on the base unit and expansion unit may be interlocked together to function as a single door. A Z pole guide on the base unit may be extended by adding expansion guide poles that guide the movement of the robotic system through the library.

7 Claims, 18 Drawing Sheets

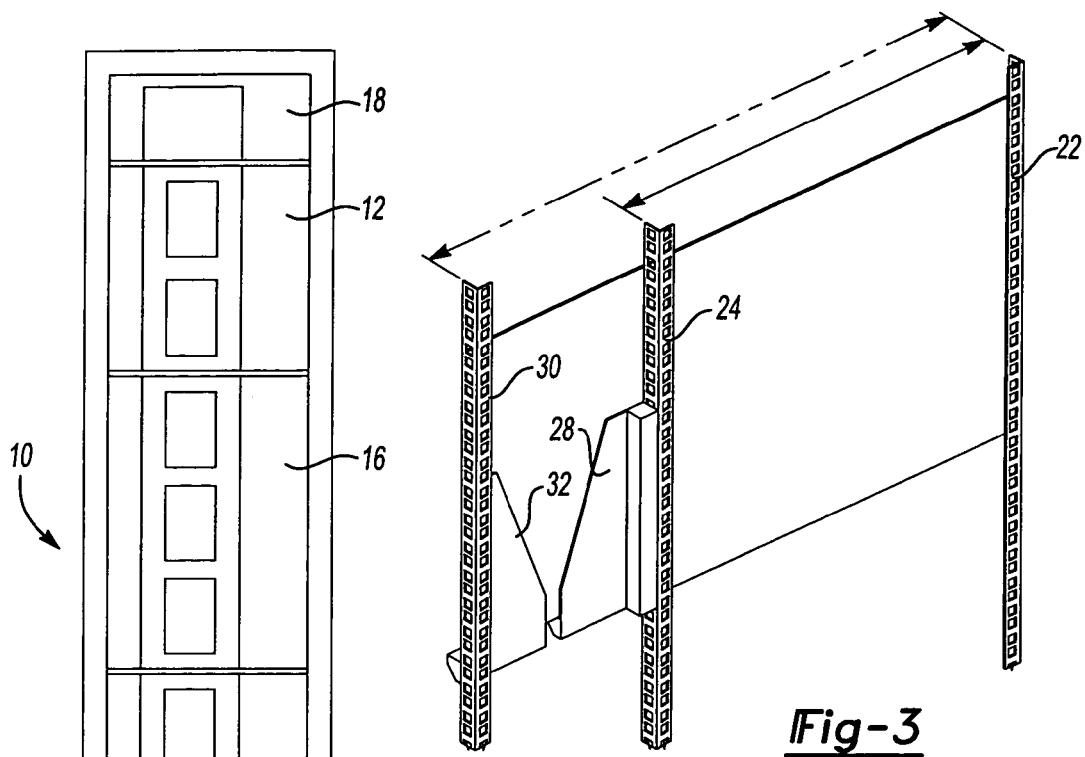
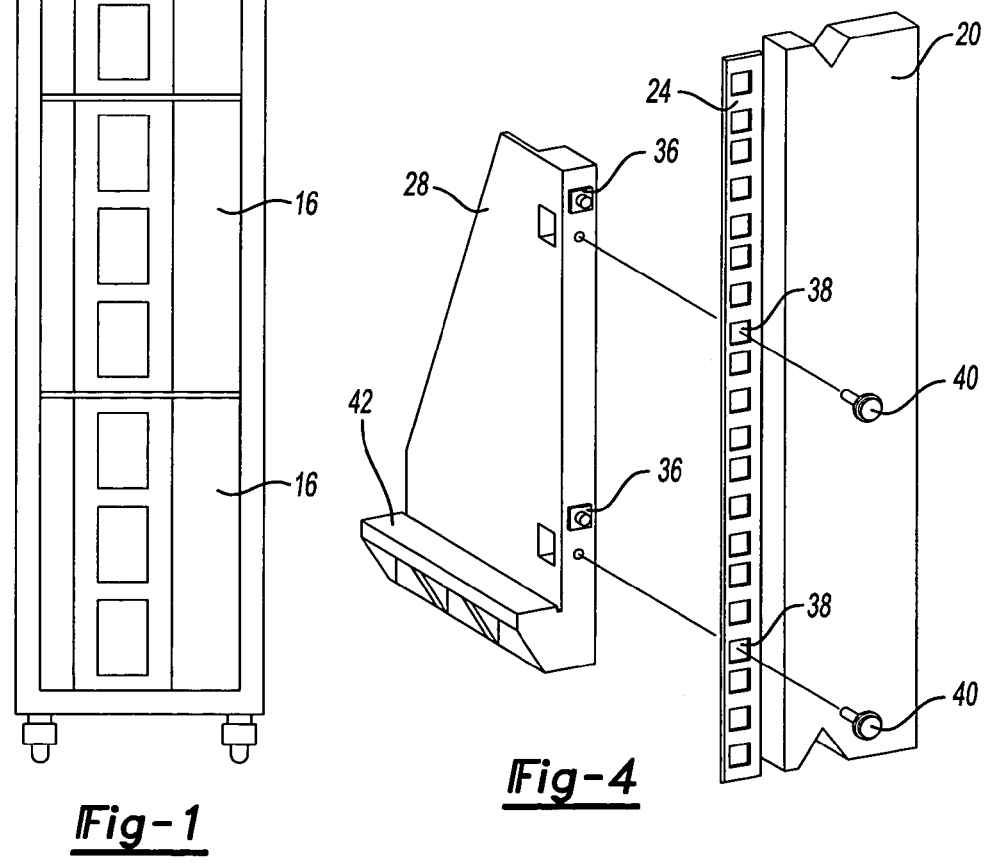

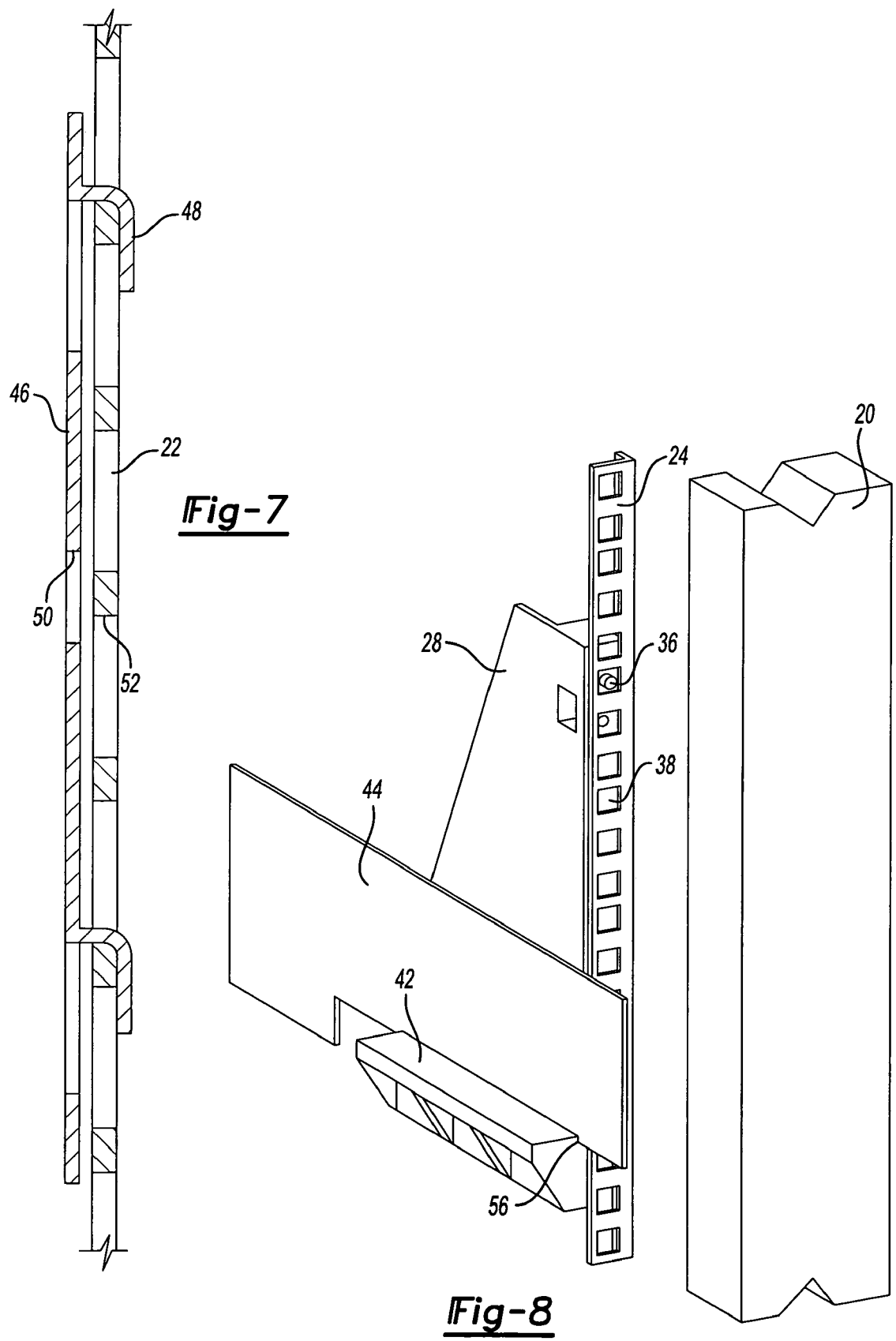

CUSTOMER EXPANDABLE MODULAR RACK MOUNT LIBRARY USING EXPANSION MODULE UNITS HAVING FEATURES TO JOIN ACCESS DOORS AND ALIGN COMPONENTS BETWEEN UNITS

CROSS-REFERENCE TO RELATED APPLICATIONS

This application claims the benefit of U.S. provisional application Ser. No. 60/638,772 filed Dec. 22, 2004.

BACKGROUND OF THE INVENTION

1. Field of the Invention

The present invention relates to rack mount libraries for storage of electronic media such as data storage tapes and disks.

2. Background Art

Rack mount libraries are used to store electronic media so that the data stored on tape or disk is available. Data storage facilities periodically require expansion to accommodate additional media. Several approaches have been proposed to accommodate expansion. The simplest approach is to replace a smaller library with a larger library, but this is the most costly approach.

Another approach is to add an additional stand-alone library. This approach offers the advantage of simplicity because an additional stand-alone library is simple to install in a rack and can then be connected to a computer system. The problem with this approach is that it is expensive to add an additional library every time there is a need for added capacity. Costs are incurred each time an additional library is added for control electronics and a robotic system. Adding additional stand-alone libraries to expand capacity creates a management problem over time because certain systems may be limited to using particular libraries and tape drives. Extra tape drives may need to be purchased for each library so that spare drives are available in each library. A robot in one library normally cannot access tapes in another library.

The problem of making tapes or disks available in separate stand-alone libraries may be addressed by connecting the libraries together with a mechanism that allows tape cartridges or disks to be passed from one stand alone library to another. Control software modifications may be required to integrate two libraries into a single system. While this approach simplifies management of the two libraries, substantial costs are associated with providing each library with its own electronics and robotic system and the cost of the mechanism used to transfer tapes or disks from one library to another. Installation of the mechanism that moves the storage media between libraries requires trained service personnel to install and test the system. The mechanism that moves the media between libraries could potentially reduce the reliability of the overall system, especially if not properly installed.

A customer's needs for increased library storage capacity can also be addressed by having a customer purchase a larger library than needed at a reduced price with many of the cartridge locations being disabled until needed by a customer. The excess capacity in the library may be purchased at a later date by a customer when the need for more capacity arises. A customer may be required to pay to have the storage library upgraded to make added capacity available. It may be possible to upgrade software simply by entering a password. This approach saves the cost of duplicate electronics, transfer mechanisms, robotics and control systems that may be required if a second library is purchased. Problems with this approach are that the extra unused capacity takes up space in a rack that could be used for other equipment. In addition, since all of the components of the larger library are initially purchased, the cost of these components must be paid for up front with an additional charge being assessed only after there is a need to expand the available storage.

Expansion kits have been provided. to address the problem of providing an economical, expandable library that can be added to an existing library. Examples of this type of system are the 2/20, 4/40, 6/60 and 6/140 library models sold by Hewlett Packard. A single vertical lift transport assembly can move through the entire library eliminating the need to provide a separate mechanism for moving cartridges between libraries. This approach also simplifies the requirements for control software and library management. This approach may also reduce the cost of storage library systems for the customer since the customer buys what they need when they need it. The problem with this approach is that adding a prior art expansion kit to a storage library is a relatively complicated process that requires substantial disassembly, removal and re-assembly. These systems have interface electronics boards in each expansion module that must be grounded to prevent damage to sensitive electronic components. The expansion kit must be accurately aligned and carefully assembled to be integrated into the system. Specially trained service personnel are required to install prior art expansion kits to ensure that the hardware is assembled properly. Unless expansion kits are installed by trained service personnel, the newly expanded library may be subject to operational problems. Using highly trained service personnel to assemble the components adds to the cost of providing an expandable library.

There is a need for a modular library that is expandable and may be expanded by a customer's own personnel. There is a need for a system that permits a customer to pay for only the storage library requirements that they need at the time of purchase and that allows them to order and install an expansion module themselves. Such an expansion module should be designed to be shipped directly to the customer who would be responsible for installing it into the rack with simple mechanical and electrical connectors. Finally, there is a need to provide such a system economically and without compromising system reliability.

SUMMARY OF THE INVENTION

According to one aspect of the present invention, a method of expanding a storage media library is provided. The library includes an enclosure, at least one media drive, a media rack, a robotic system for picking and placing a plurality of storage media in the media rack, a guide rail for guiding the robotic system, and a processor for controlling the robotic system. The processor records storage locations of the storage media in the media rack for subsequent retrieval. The method of expanding the storage media library comprises removing a panel from a fixed supporting structure on the enclosure and assembling a module, including a supplemental media rack, to the fixed supporting structure on the enclosure at the location from which the panel of the enclosure was removed. The processor is updated to include location data relating to the supplemental media rack.

Other aspects of the method of the present invention include the concept that the panel removed from the enclosure is a floor panel of the enclosure. The floor panel is supported on flanges and the floor panel is removed by sliding relative to the flanges. The floor panel may be reassembled to a floor opening on the opposite of the module that is assembled to the enclosure by sliding the floor panel on replication flanges.

Alternatively, the step of reassembling the panel to the open side of the module may be performed on an open side of the module on the opposite side of the module from the side of the module that is assembled to the enclosure.

According to other aspects of the method, the method may further comprise providing a door on the enclosure and a supplemental door on the module. The supplemental door on the module is assembled to the door on the enclosure. A first engagement feature may be provided on the door and a second engagement feature may be provided on the supplemental door. The method may then include the step of engaging the first and second engagement features to join the supplemental door to the door.

According to other aspects of the method, robotic systems and processors are provided with a capacity to service the media rack and a predetermined number of supplemental media racks. A digital message may be provided in association with the module that is readable by the processor to identify the module to the processor.

According to another aspect of the invention, an expandable storage library for a removable data storage article is provided. The expandable storage library comprises a rack, a base unit assembled to the rack including an enclosure, at least one media drive, a digital storage article rack, a robotics system for storing and accessing a plurality of data storage cartridges, a processor for controlling the robotic system that records the storage locations of the data storage articles and the data storage rack for subsequent retrieval. An expansion module having a supplemental media rack is assembled to the enclosure by sliding the module onto the guide rails without further disassembly of the enclosure. An interface is provided between the expansion module and the base unit that enables a robotic system and processor to store and retrieve data storage articles that may be stored in the data storage article rack or supplemental data storage article rack.

According to other aspects of the invention as they relate to the expandable storage library, the removable panel may be removed from a vertically facing wall of the enclosure such as the top or bottom wall of the enclosure. If the removable panel is a floor panel of the base unit, the floor panel is assembled to the expansion unit on a bottom side of the expansion module. Alternatively, the expansion module may have an open side on the side of the expansion module facing away from the base unit and the removable panel may be removed from the base unit and assembled to the open side of the expansion module.

The expandable storage library may further comprise a door on the enclosure and a supplemental door on the module that is assembled to the door on the enclosure when the expansion module is assembled to the base unit. A first engagement feature may be provided on the door and a second engagement feature may be provided on the supplemental door. The first and second engagement features are engaged to join the supplemental door to the door.

Another aspect of the invention, as it relates to an expandable storage library, relates to how the expansion module is supported in a rack. A storage library includes a base unit that is installed in a rack. The base unit includes a media drive, digital storage article rack, a robotic system and processor as previously described. The base unit also has a first engagement feature. An expansion module has a supplemental media rack that is assembled to an expansion enclosure. The expansion module slides into engagement with the base unit. A second engagement feature is provided on the expansion unit so that the first and second engagement features are engaged to horizontally align the expansion unit with the base unit as the expansion unit slides into engagement with the base unit.

An interface is provided between the expansion module and the base unit, as previously described.

According to other aspects of the invention, the expandable storage library may further comprise a base guide rail in the base unit that guides the robotic system as it moves vertically within the base unit and an expansion guide rail that guides the robotic system as it moves vertically within the expansion unit. The base guide rail and expansion guide rail may be joined together by an expansion bracket that engages the bottom end of the base guide rail and top end of the expansion guide rail. The expansion bracket may be a flexible member. The base unit guide rail and expansion unit guide rail may be hollow tubular members. The expansion bracket may include a semi-spherical top portion on a top end that is received by the base guide rail and a semi-spherical bottom portion on a bottom end that is received by the expansion guide rail.

The expandable storage library may also include at least one set of guide rails that are secured to a set of front tracks and at least one set of rear support brackets that are secured to a set of rear tracks. The rear support brackets have receptacles for receiving the side rails in a range of locations.

The above aspects of the present invention and other aspects will be better understood in view of the attached drawings and following detailed description of the illustrated embodiments.

BRIEF DESCRIPTION OF THE DRAWINGS

FIG. 1 is a front elevation view of a modular rack mount library made according to one embodiment of the present invention;

FIG. 3 is a fragmentary perspective view of front and two alternative rear tracks with rear support brackets in two different orientations;

FIG. 4 is a fragmentary rear perspective view of a rear support bracket and rear track;

FIG. 7 is a cross-sectional view showing a side rail secured to a front track;

FIG. 8 is a fragmentary exploded rear perspective view of a side rail that is received in a groove of a rear support bracket;

DETAILED DESCRIPTION OF THE PREFERRED EMBODIMENT(S)

Figure 2:
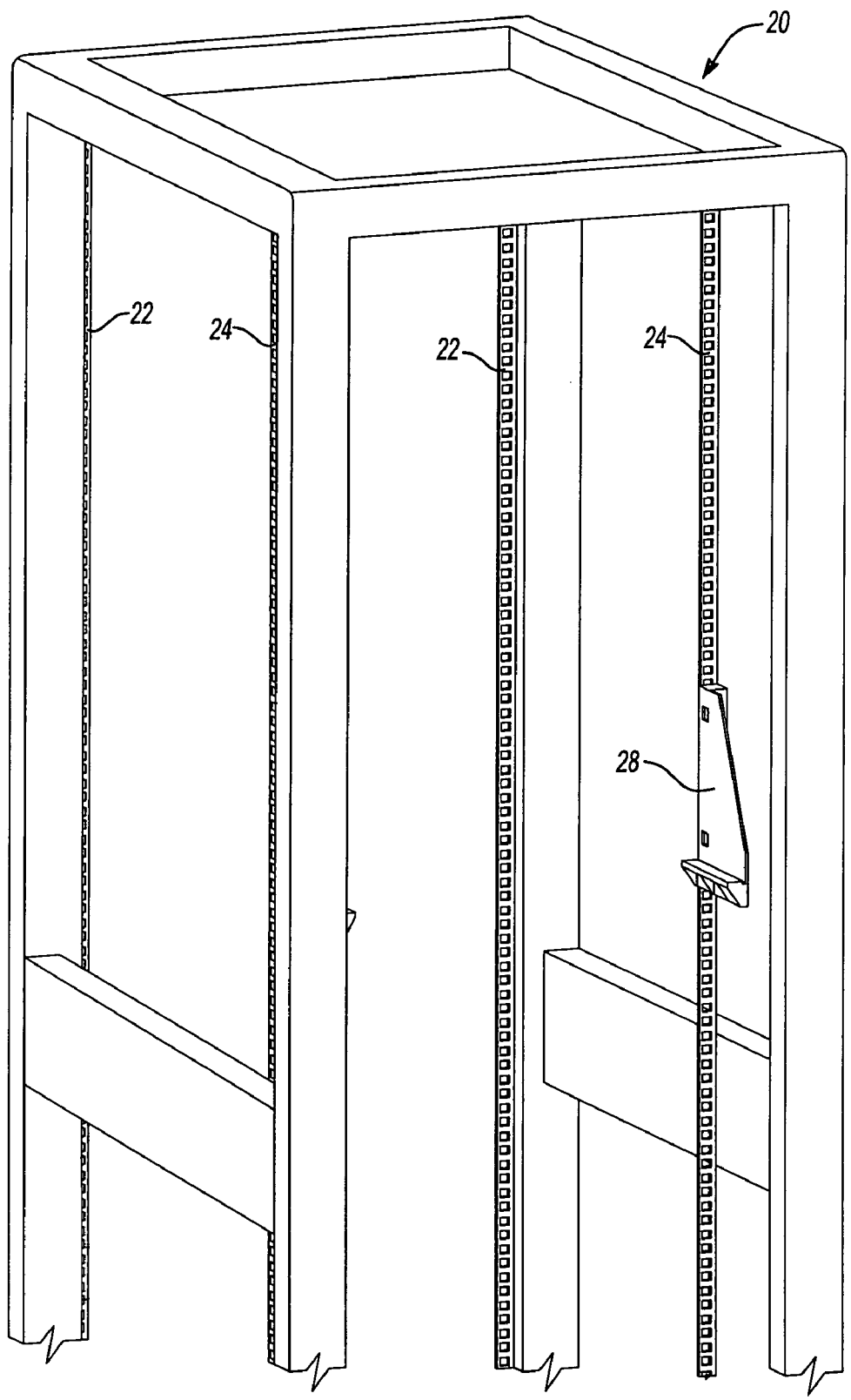
FIG. 2 is a fragmentary rear perspective view of a rack and a rear support bracket.

Referring to FIG. 1, an expandable storage library 10 is illustrated. The expandable storage library 10 is shown with a full rack, including a base unit 12 and four expansion units 16. A robotic system 18 is provided in conjunction with the base unit 12 and is capable of placing in storage and retrieving data storage articles such as data storage tapes or data storage disk cartridges. The expansion units 16, or modules, may be added one at a time to the base unit 12 to provide sufficient storage capacity for the storage media. More than one expansion unit 16 may be added to the library 10, if desired. As described in this specification, one expansion unit 16 is assembled to the base unit 12, but it should be understood that additional expansion units 16 may be stacked together with a base unit 12 to provide additional storage capacity.

Referring to FIGS. 2-4, a rack 20 for the expandable storage library 10 is shown. The rack 20 comprises a frame on which a pair of front tracks 22 and a pair of rear tracks 24 are provided. A rear support bracket 28 is secured to the rear track 24. Referring specifically to FIG. 3, an alternate rear track 30 is shown that is at a greater distance from the front track 22. A reversely oriented rear support bracket 32 that is otherwise identical to bracket 28 is shown secured to the alternate rear track 30 in a reverse orientation as compared to the orientation of the support bracket 28. Expandable storage libraries 10 are generally provided to fit storage racks 20 that are of a range of depths. The same support bracket part may be used as either a rear support bracket 28 or a reversely oriented bracket 32.

Referring to FIG. 4, the rear support bracket 28 is shown as it is about to be assembled to a rear track 24. Square pegs 36, or tabs, are aligned to be inserted into square holes 38 provided in the rear track 24. After the pegs 36 have been inserted in the holes 38, one or more fasteners 40 may be provided to secure the rear support bracket 28 to the rear track 24. The fastener 40 may also include a nut clip (not shown) that may be secured to the rear track 24 and receives a threaded fastener that may be assembled to the support bracket 28 and through the rear track 24. The rear support bracket 28 has a support ledge 42 that is used to support either a base unit 12 or an expansion unit 16.

Figure 5:
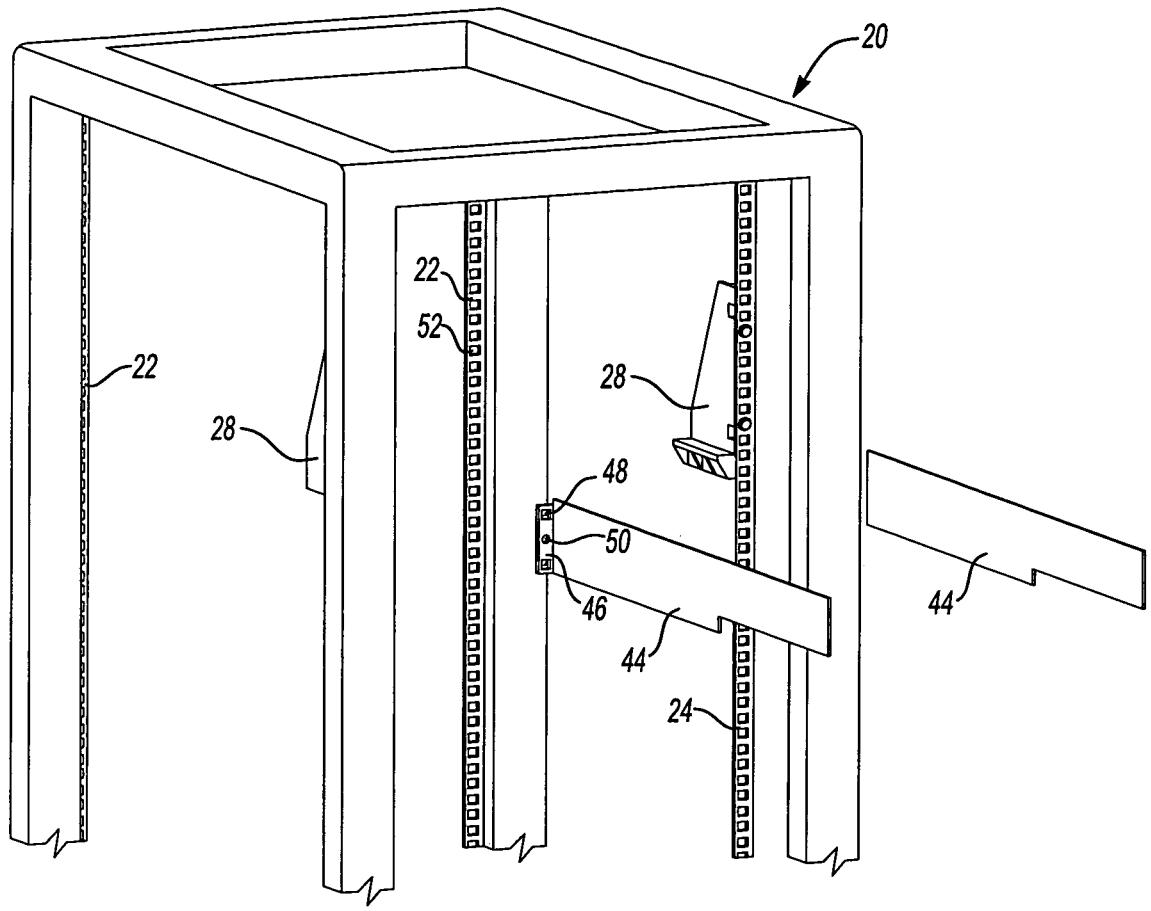
FIG. 5 is a fragmentary exploded rear perspective view of a storage rack with side rails and rear support brackets.

Referring now to FIGS. 5-11, further details regarding the supporting structure for a base unit 12 or expansion unit 16 are illustrated. Referring specifically to FIG. 5, side panels 44 are shown in position to be secured to rear support brackets 28.

Figure 6:
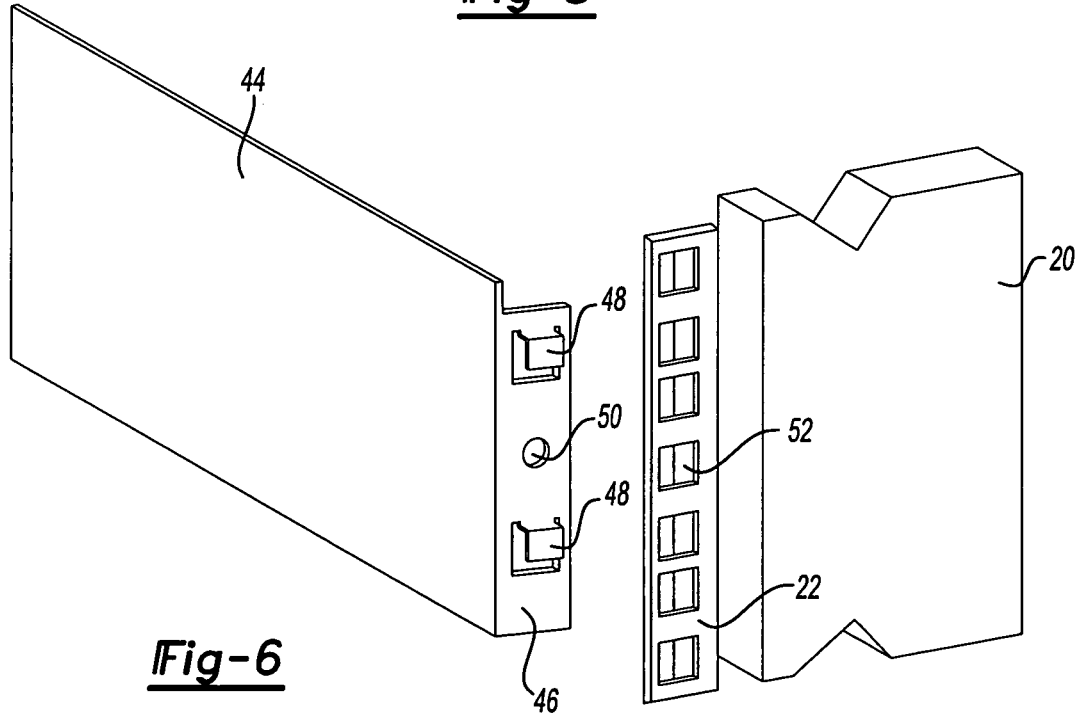
FIG. 6 is a fragmentary exploded front perspective view of a side rail oriented for attachment to a front track.

As best shown in FIG. 6, the side panels 44 each have a flange 46 that is assembled to the front rails 22 by clips 48 and a hole 50 that may receive a fastener. The clips 48 are inserted into square holes 52 provided in the front rail 22 to hold the side panels 44 in engagement with the front track 22. Front track 22 is secured to the rack 20. Referring to FIG. 7, the flange 46 of the side panel 44 is shown secured to the front track 22 with the clips 48 being received in the square hole 52 formed in the front track 22. A hole 50 is provided on the flange 46 for receiving a fastener (not shown) that may be provided if desired to further secure the flange 46 to the track 22. While square holes 52 and clips 48 are illustrated, other shaped holes and clips could be provided.

Referring to FIG. 8, attaching the side panel 44 to the rear support bracket 28 and rear track 24 in a range of positions is illustrated. Due to the fact that a wide variety of racks of different depths may be used to support the library, a flexible support system is provided in this embodiment of the expandable storage library. Rear support bracket 28 is secured to the rear track 24 by pegs 36 that are received in holes 38 formed in the rear track 24. A fastener (not shown in FIG. 8) can be used to secure the rear support bracket 28 to the rear track 24. A groove 56 is formed adjacent the support ledge 42 of the rear support bracket 28. The groove 56 receives a lower edge of the side panel 44. The side panel 44 may be received by the rear support bracket in a wide range of locations. The range may be further expanded by reversing the orientation of the bracket 28.

Figure 9:
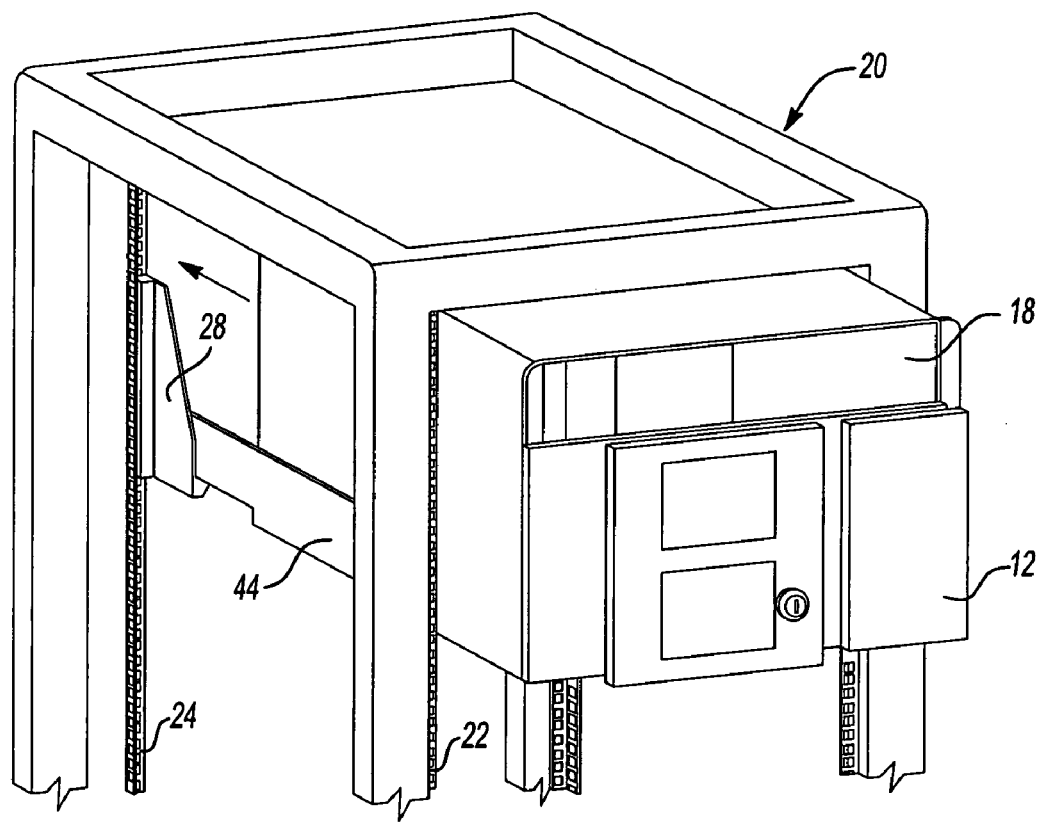
FIG. 9 is a fragmentary front perspective view of a base unit supported by side rails and a rear support bracket during installation of the base unit.

Referring to FIG. 9, a rack 20 is shown with a base unit 12 partially installed. The base unit 12 is shown sliding along the side panel 44 toward the rear support bracket 28. The rear support bracket 28 is supported on the rear track 24, as previously described, and the side panel is secured to the front track 22. A robotic system 18 is shown stacked above the base unit 12 and may be moved into the rack with the base unit 12.

Figure 10:
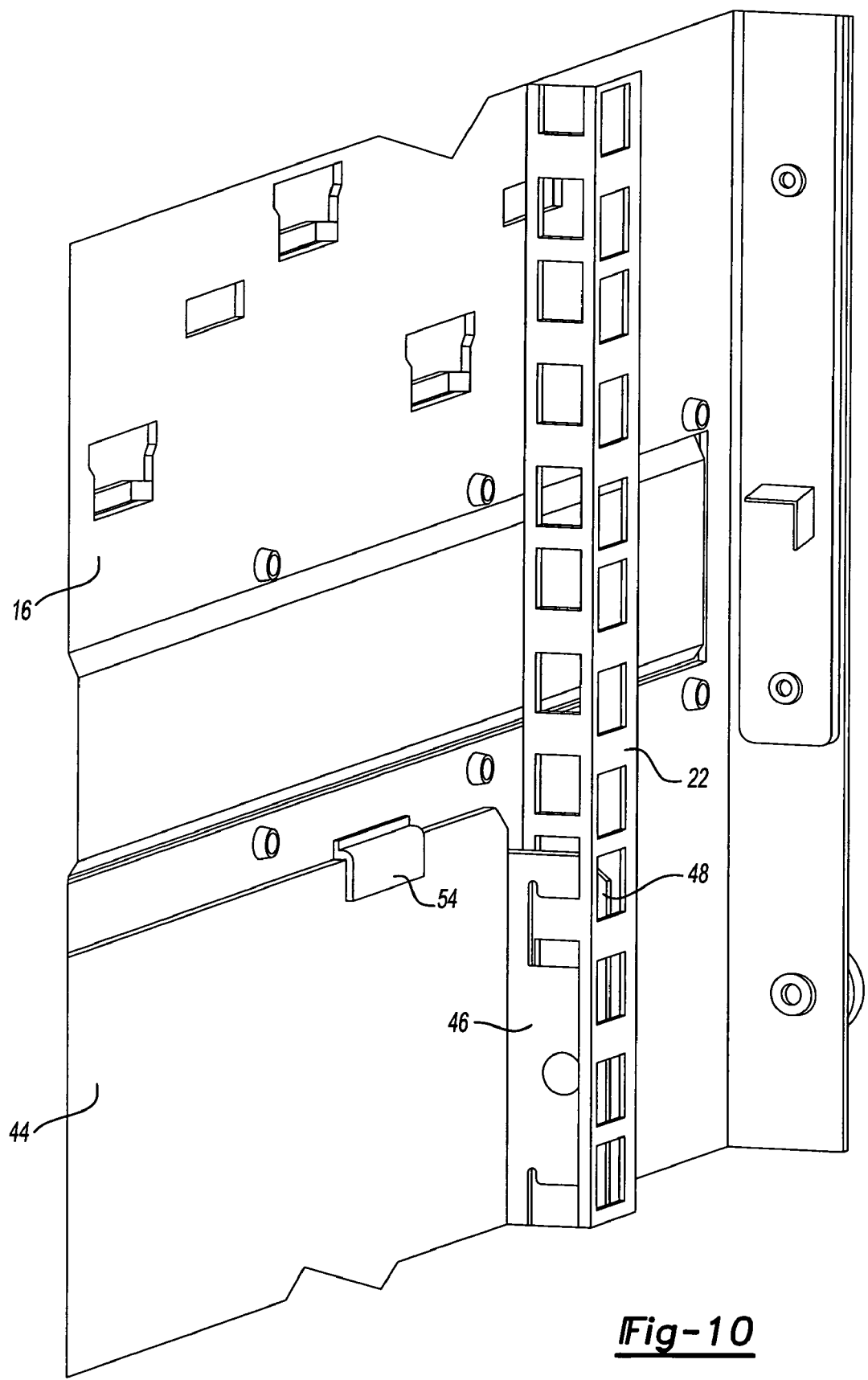
FIG. 10 is a fragmentary inside front perspective view of an expansion unit received on a side rail that is secured to a front track.

Referring to FIG. 10, an expansion unit 16 is shown partially installed with a tab 54 engaging a side panel 44. The tab 54 slides along the top of the side panel 44 as the expansion unit 16 slides relative to the front rail 22. The side panel 44 and flange 46 are secured to the front rail 22 by the clips 48 being received in holes 52 formed in the front rail 22.

Figure 11:
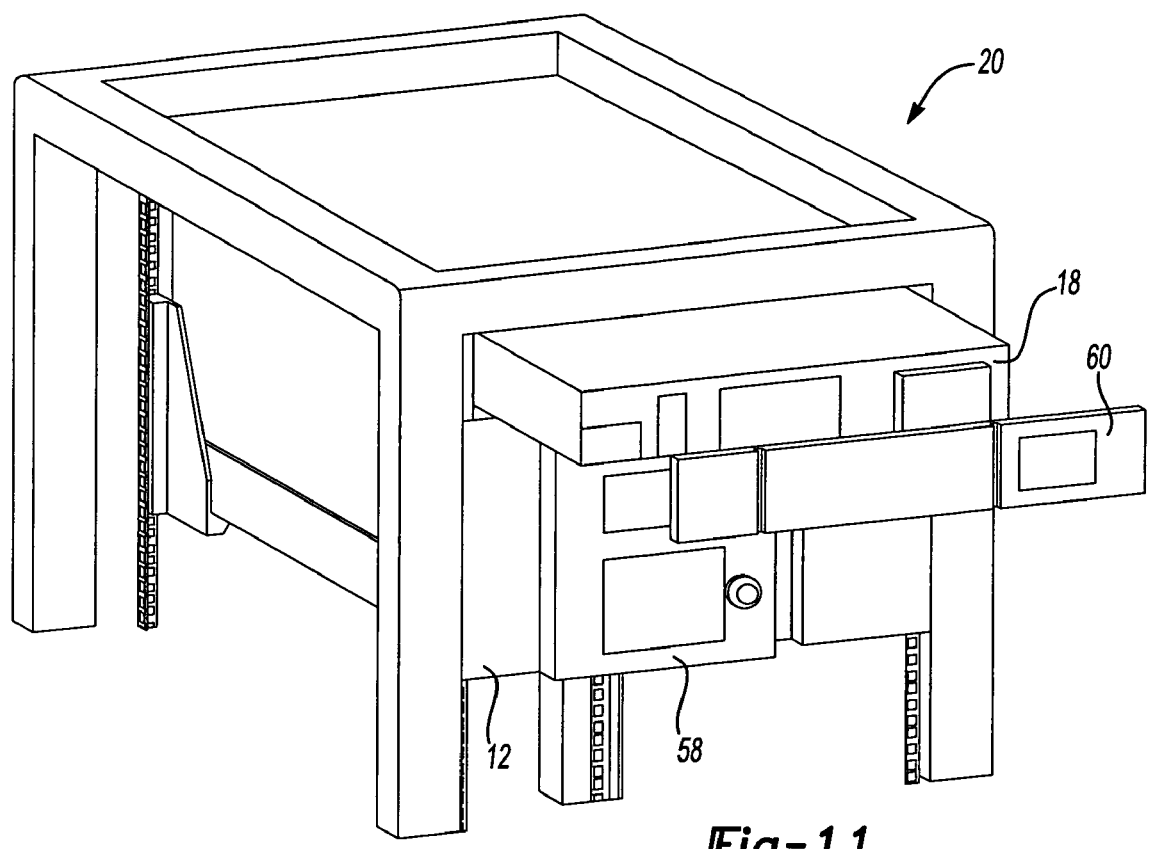
FIG. 11 is a fragmentary front perspective view of a robot module and facade panel being installed in the rack with the base unit.

Referring to FIG. 11, a rack 20 is shown with a base unit 12 fully installed in the rack and a robotic unit 18 partially installed in the rack 20. The base unit 12 includes a front center door 58 that is used to provide access to the interior of the base unit 12. A face plate 60 may be assembled over the front of the robotic system 18 primarily for decorative purposes.

Figure 12:
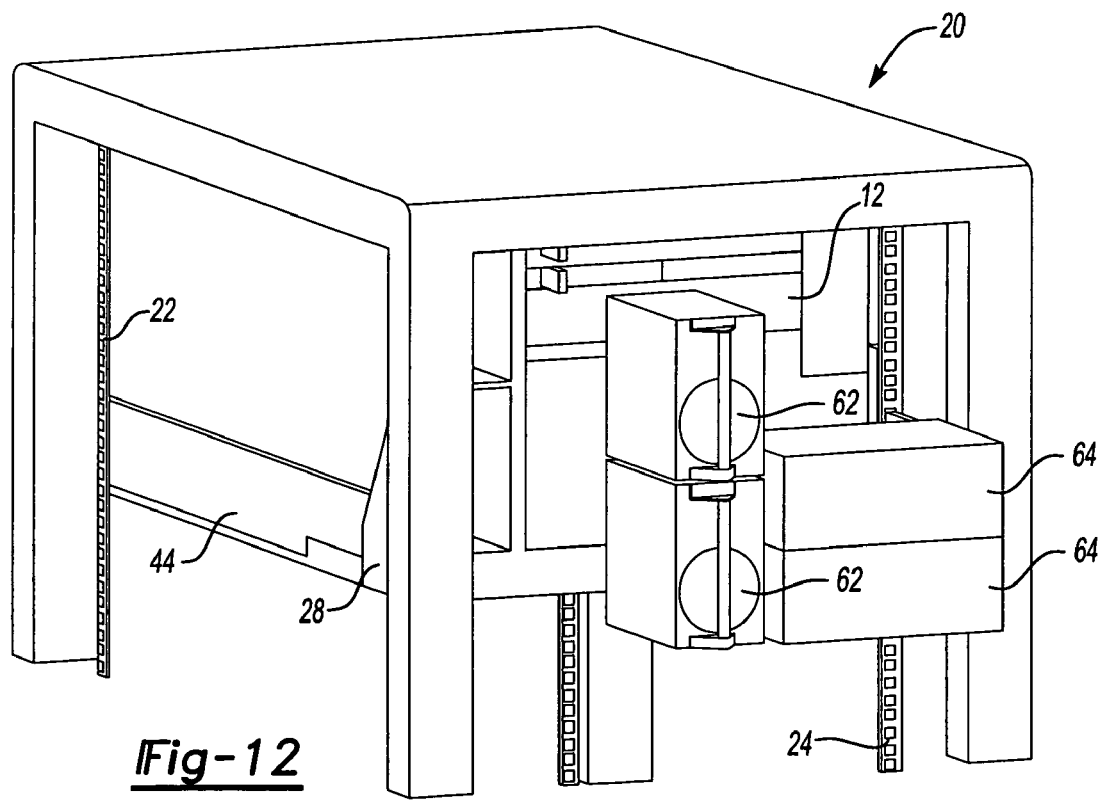
FIG. 12 is a fragmentary rear perspective view showing tape drives and power supplies in position to be assembled to the rear of the base unit.

Referring to FIG. 12, the rear of a base unit 12 is shown as it is installed in the rack 20. The base unit 12 is supported by the side panels 44 and rear support brackets 28 that are provided on opposite sides of the base unit 12. The side panel 44 is secured to the front track 22 on its front end and is secured on its rear end to the rear support brackets 28 that are in turn supported on the rear track 24. Two tape drives 62 and two power supplies 64 are assembled to the back of the base unit 12.

Figure 13:
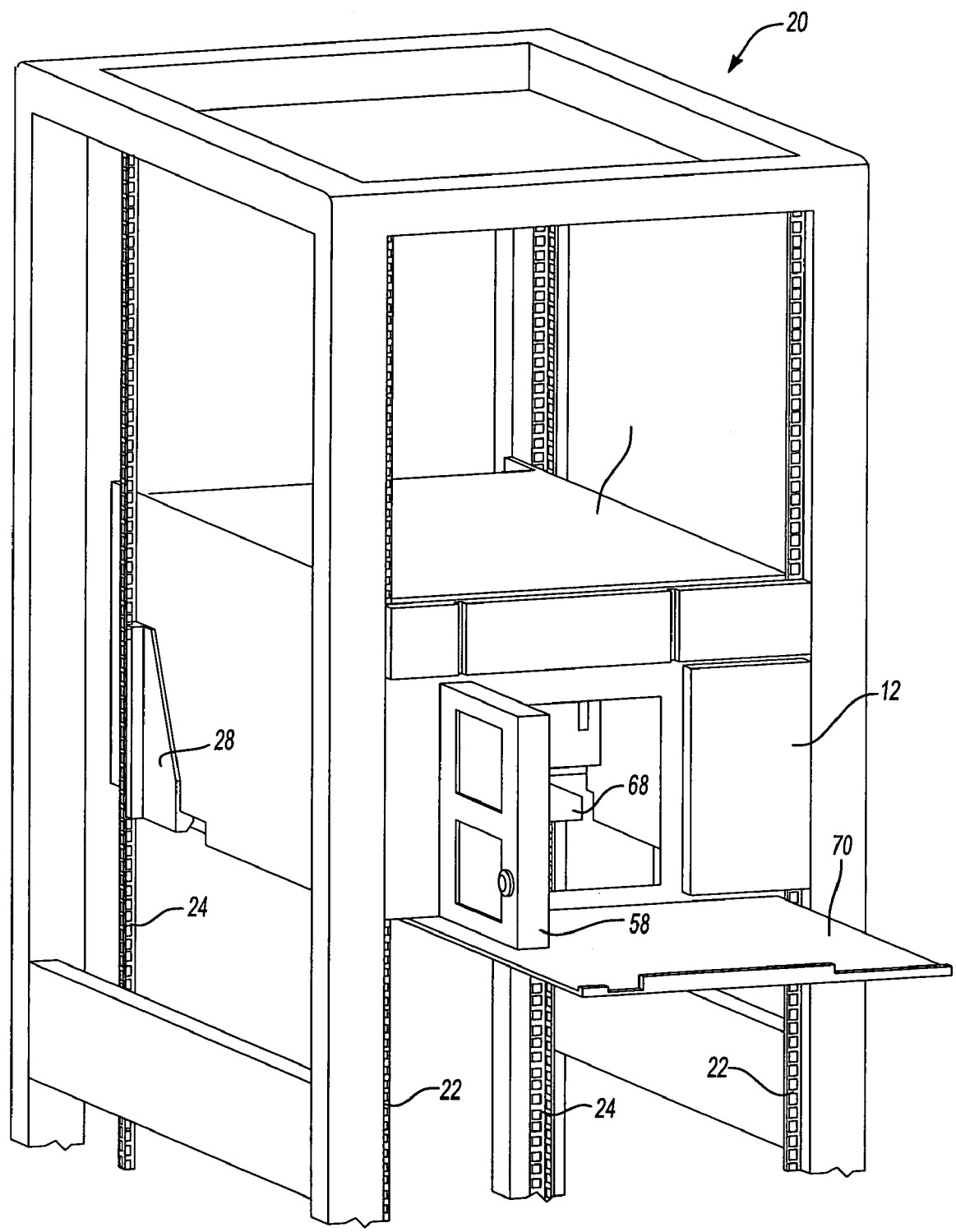
FIG. 13 is a fragmentary front perspective view of a rack mount with a base unit installed and the floor of the base unit being removed.

Referring generally to FIGS. 13-20, a storage library 10 is shown initially with a base unit 12 and the steps of adding an expansion unit 16 are described. Referring specifically to FIG. 13, the base unit 12 is shown installed in the rack 20 and as it is supported between the front tracks 22 and the rear tracks 24. Rear support bracket 28 supports the base unit 12 relative to the rear track 24. A robotic system 18 is shown above and adjacent to the base unit 12. The front center door 58 of the base unit 12 is shown in its open position revealing a plurality of storage media racks 68. A repositionable floor panel 70 is shown being removed from beneath the base unit 12. Removing the floor panel 70 opens the bottom of the base unit 12.

Figure 14:
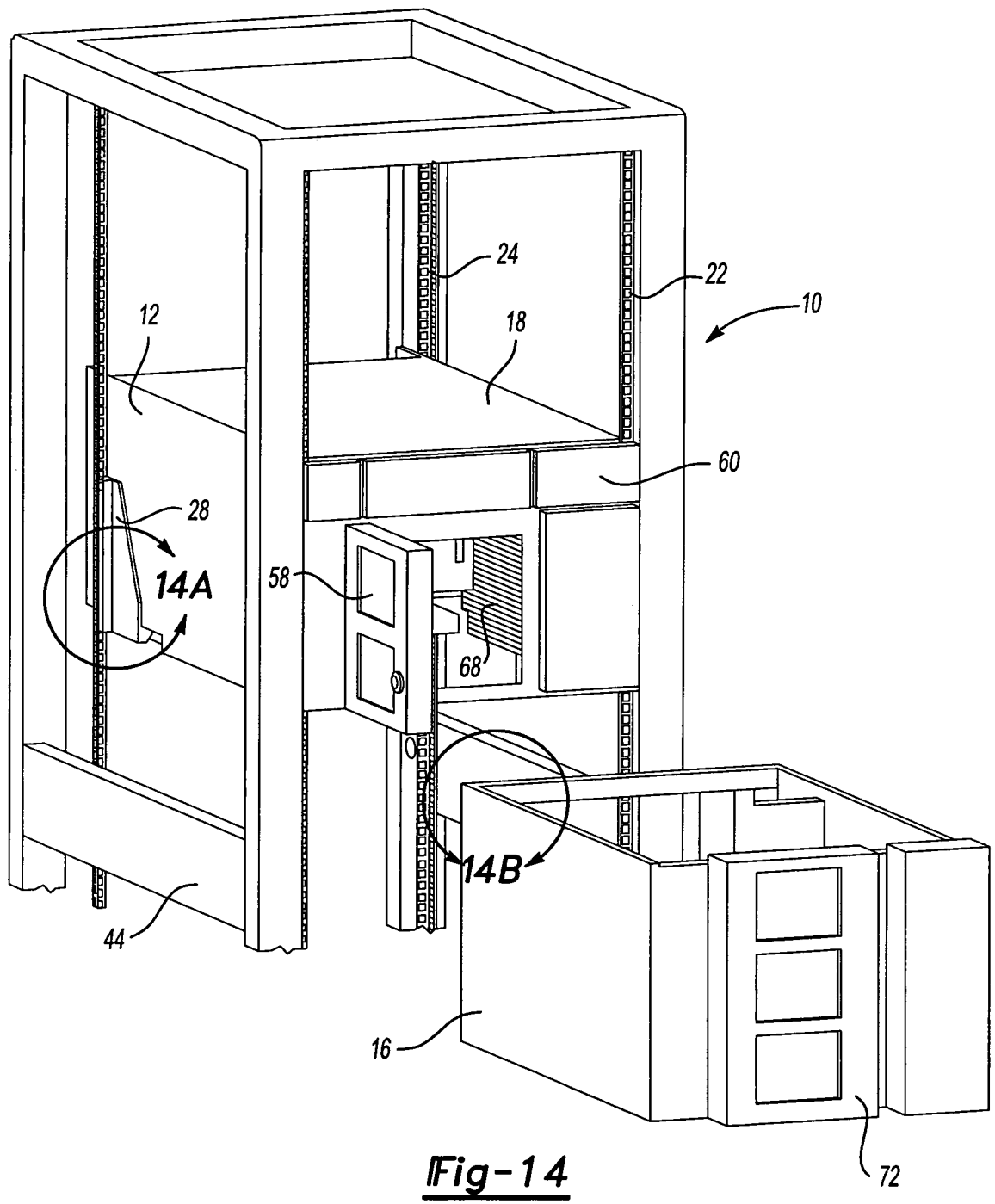
FIG. 14 is a fragmentary front perspective view of a rack including a base unit with an expansion module positioned to be installed below the base unit.

Referring to FIG. 14, an expansion unit 16 is shown in position prior to being assembled to the storage library 10. The base unit 12 and robotic system 18 are both shown assembled to the rack 20, as previously described with reference to FIG. 13. The expansion unit 16 has an expansion unit center door 72 that is shown in its closed position.

Figure 14A:
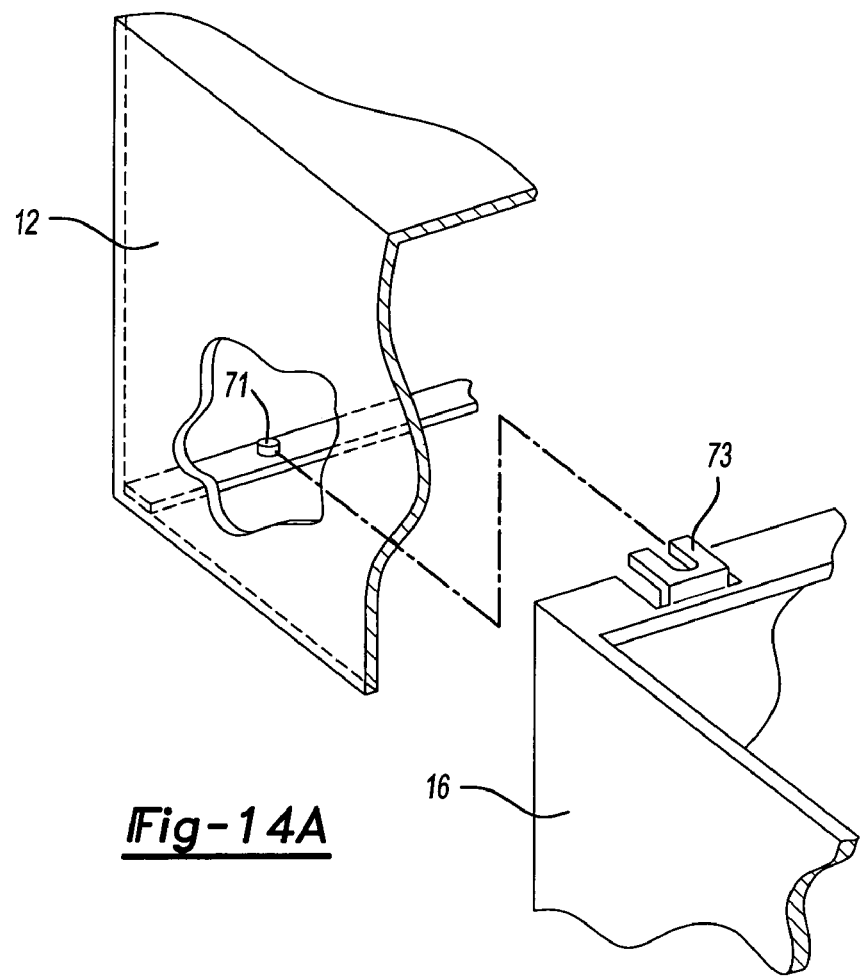
FIG. 14a is a fragmentary exploded perspective view of a set of rear alignment features.
Figure 14B:
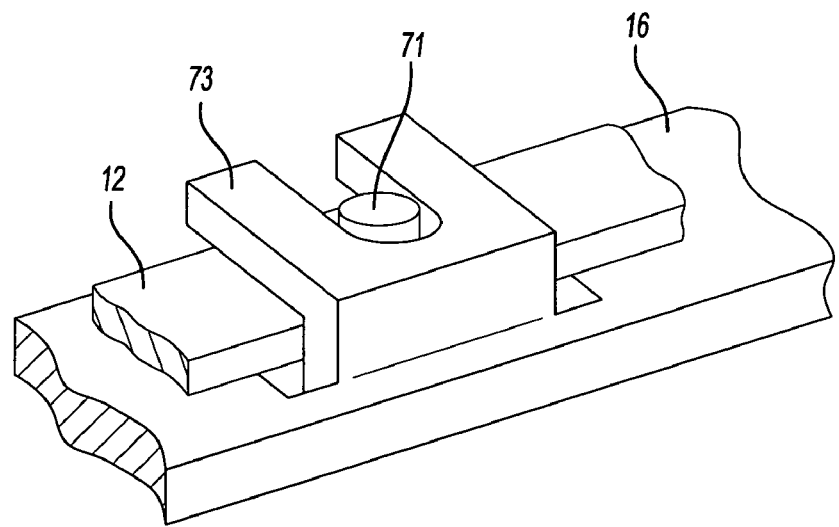
FIG. 14b is a fragmentary perspective view of the rear alignment features assembled together.

Referring to FIGS. 14a and 14b, a rear alignment guide is shown that may be used to align vertically adjacent a base unit 12 and an expansion unit 16 or two expansion units 16. The alignment guide aligns the expansion unit horizontally as it slides into position below the vertically adjacent unit. The alignment guide includes a pin 71 on the upper unit and a slotted tab 73 on the expansion unit 16. When the pin 71 is fully received in the slotted tab 73, the units are in alignment.

Figure 15:
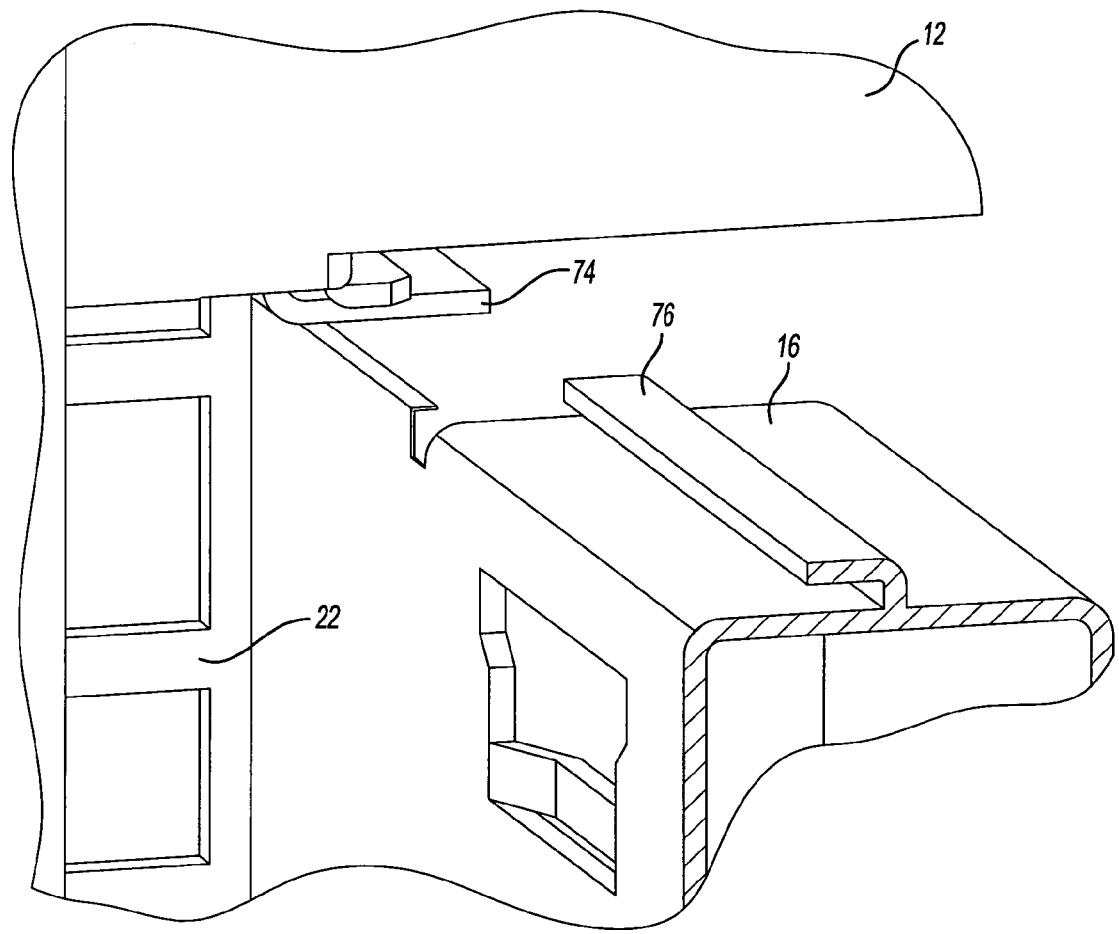
FIG. 15 is a fragmentary perspective view of an expansion module having a flange that is adapted to be secured to a flange on the base unit.

Referring to FIG. 15, a detail is shown wherein a first flange 74 formed on the bottom of the base unit 12 that formerly supported the floor panel 70 is shown ready to receive a second flange 76 formed on the top of the expansion unit 16. After the floor panel 70 is removed from the base unit 12, the expansion unit 16 can be easily and precisely located relative to the base unit 12 when the first and second flanges 74 and 76 are in engagement.

Figure 16:
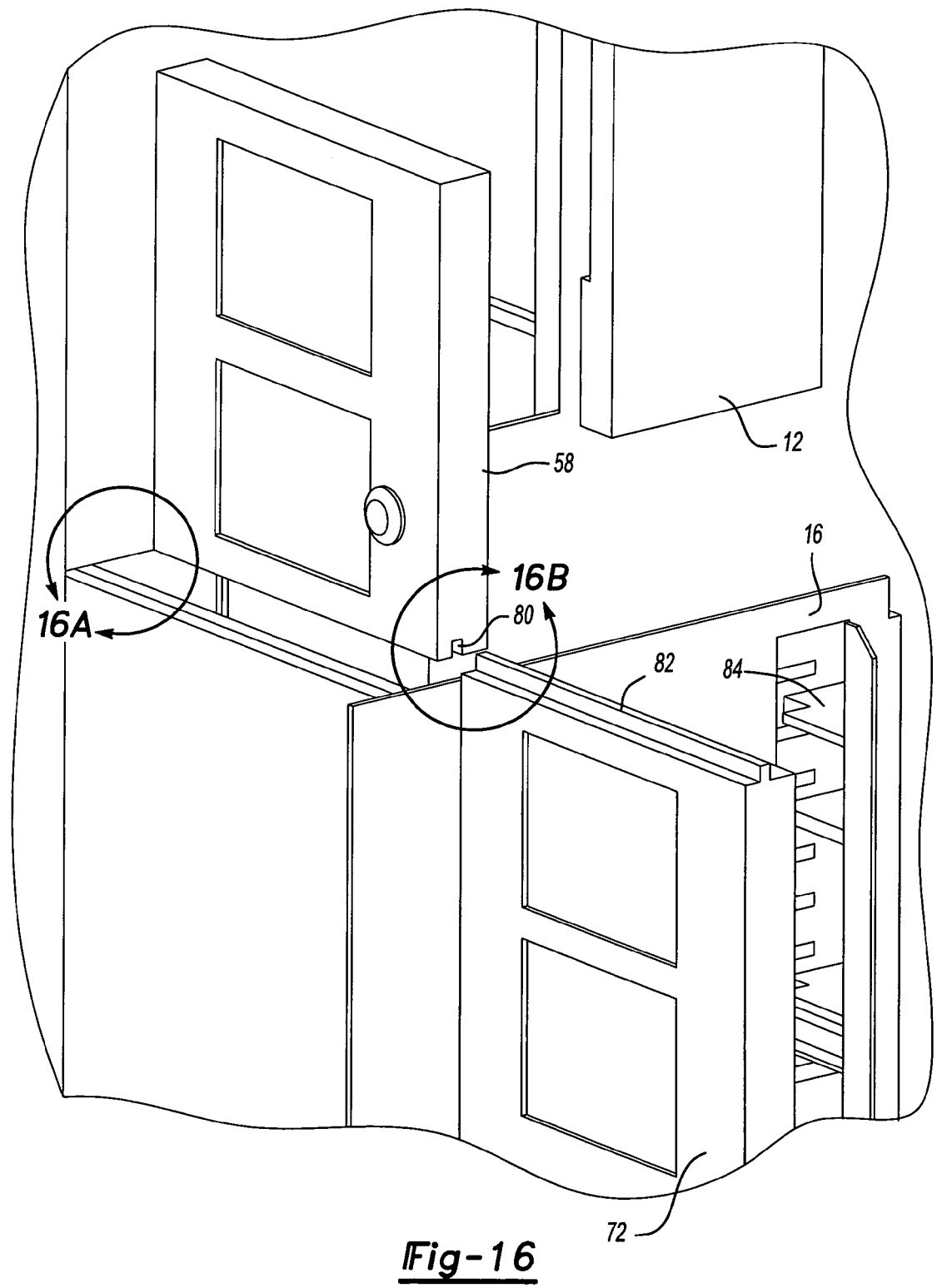
FIG. 16 is a fragmentary front perspective view of a door on an expansion unit in position for assembly to a door on the base unit.

Referring to FIG. 16, the expansion unit center door 72 is shown in its open position and in alignment with the front center door 58. A groove 80 is provided in the front center door 58 that receives a tongue 82 formed in a top edge of the expansion unit center door 72. Expansion media racks 84 are shown inside the expansion unit 16.

Figure 16A:
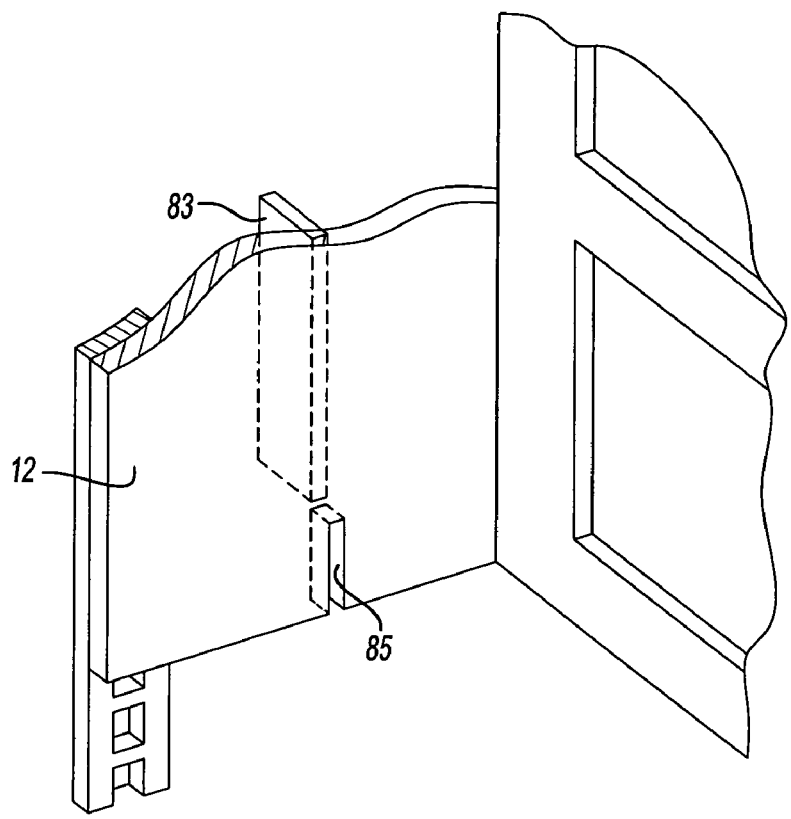
FIG. 16a is a fragmentary perspective view of a base unit front wall having a guide track rib and a slot.
Figure 16B:
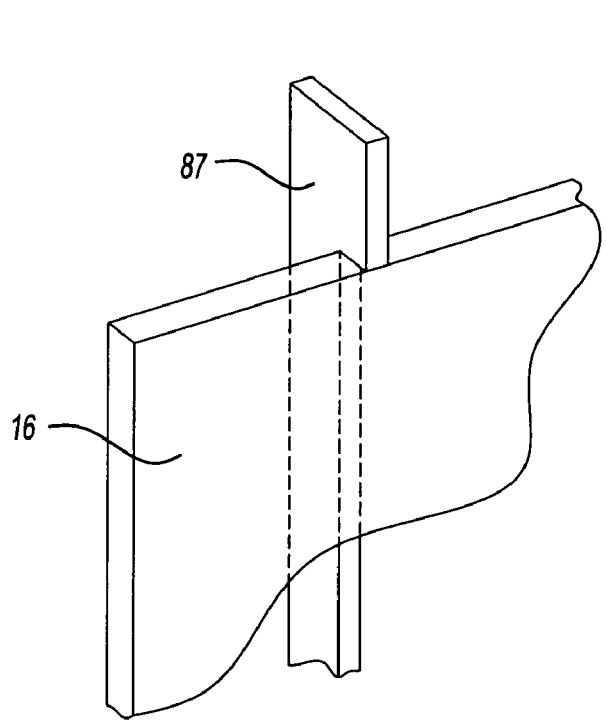
FIG. 16b is a fragmentary perspective view of an expansion unit front wall having an extension of a guide track.
Figure 16C:
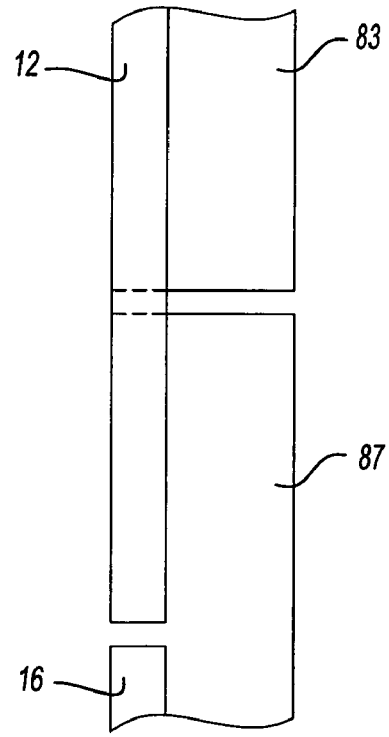
FIG. 16c is a side elevation view of the expansion guide track assembled to the slot in the base unit front wall.

Referring to FIGS. 16a, 16b, and 16c, a guide track rib 83 is provided on a front wall of the base unit 12. The guide rib 83 guides the robotic system 18 as it moves through the base unit 12. A slot 85 is formed in the front wall that receives an expansion guide rib 87. Guide track rib 83 is aligned with the expansion guide rib 87 and they cooperate to guide the robotic system 18.

Figure 17:
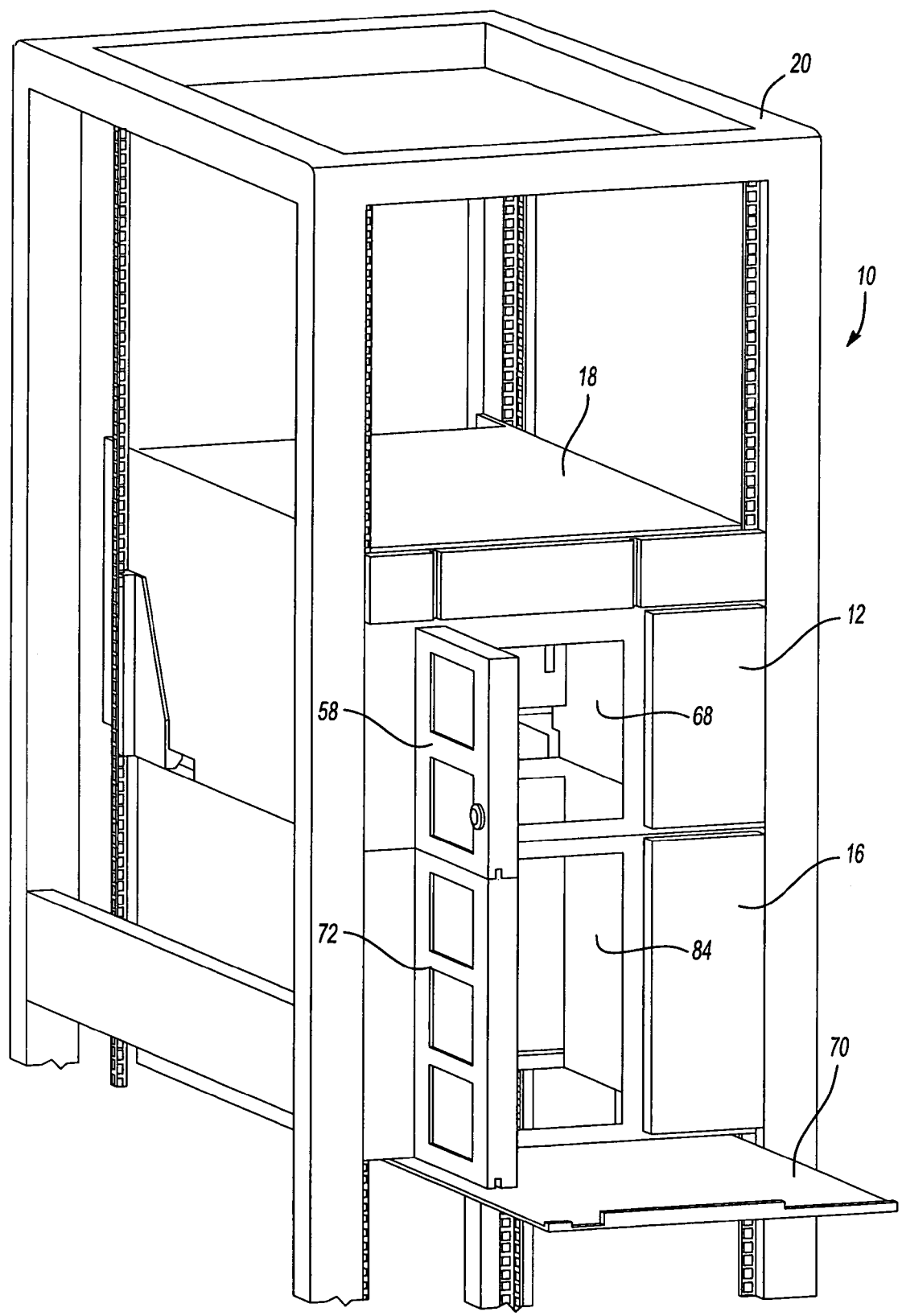
FIG. 17 is a fragmentary front perspective view showing an expansion unit assembled to a base unit with the floor of the base unit being installed below the expansion unit.

Referring to FIG. 17, a storage library 10 is shown with a base unit 12 and expansion unit 16 fully assembled in the rack 20. The floor panel 70 is shown being reinserted below the expansion unit 16 to close off the opening in the bottom of the expansion unit 16. The front center door 58 and expansion unit center door 72 are shown in engagement so that they provide access to storage media racks 68 in the base unit 12 and expansion media racks 84 in the expansion unit 16. The robotic system 18 can access the storage media in either of the storage media racks 68 or the expansion media racks 84.

Figure 18:
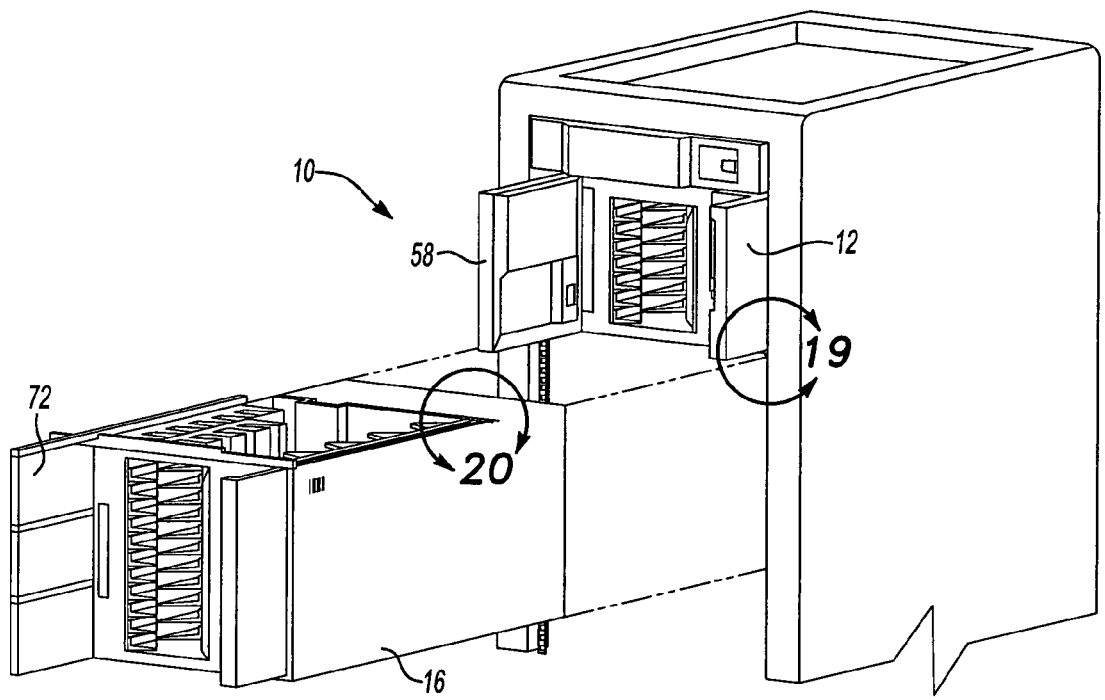
FIG. 18 is a fragmentary perspective view showing an expansion unit in position to be installed on a base unit that is mounted in the rack.
Figure 19:
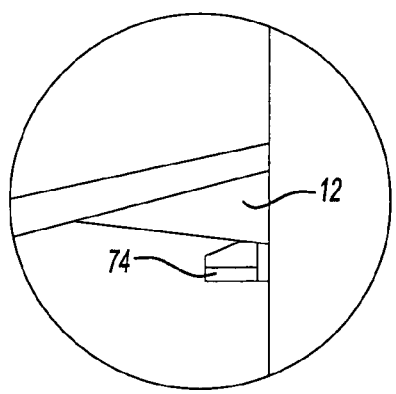
FIG. 19 is a magnified view showing the flange on the base unit.
Figure 20:
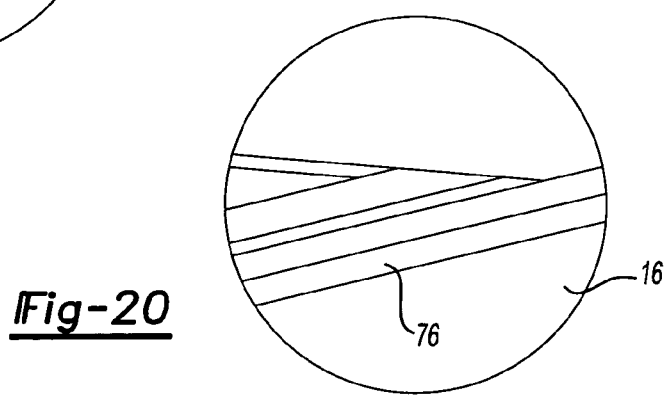
FIG. 20 is a magnified view showing the flange on the expansion module.

Referring to FIGS. 18-20, further detail regarding the attachment of the expansion unit 16 to the base unit 12 is provided. The expansion unit 16 is received on the first flange 74 that, as shown in FIG. 19, is supported on the base unit 12. The second flange 76 is provided on the upper part of the expansion unit 16 and is received in a sliding relationship by the first flange 74 on the base unit 12. As expansion unit 16 is inserted in storage library 10, the expansion unit center door 72 is aligned with and assembled to the front center door 58 of the base unit 12, as previously described.

Figure 21:
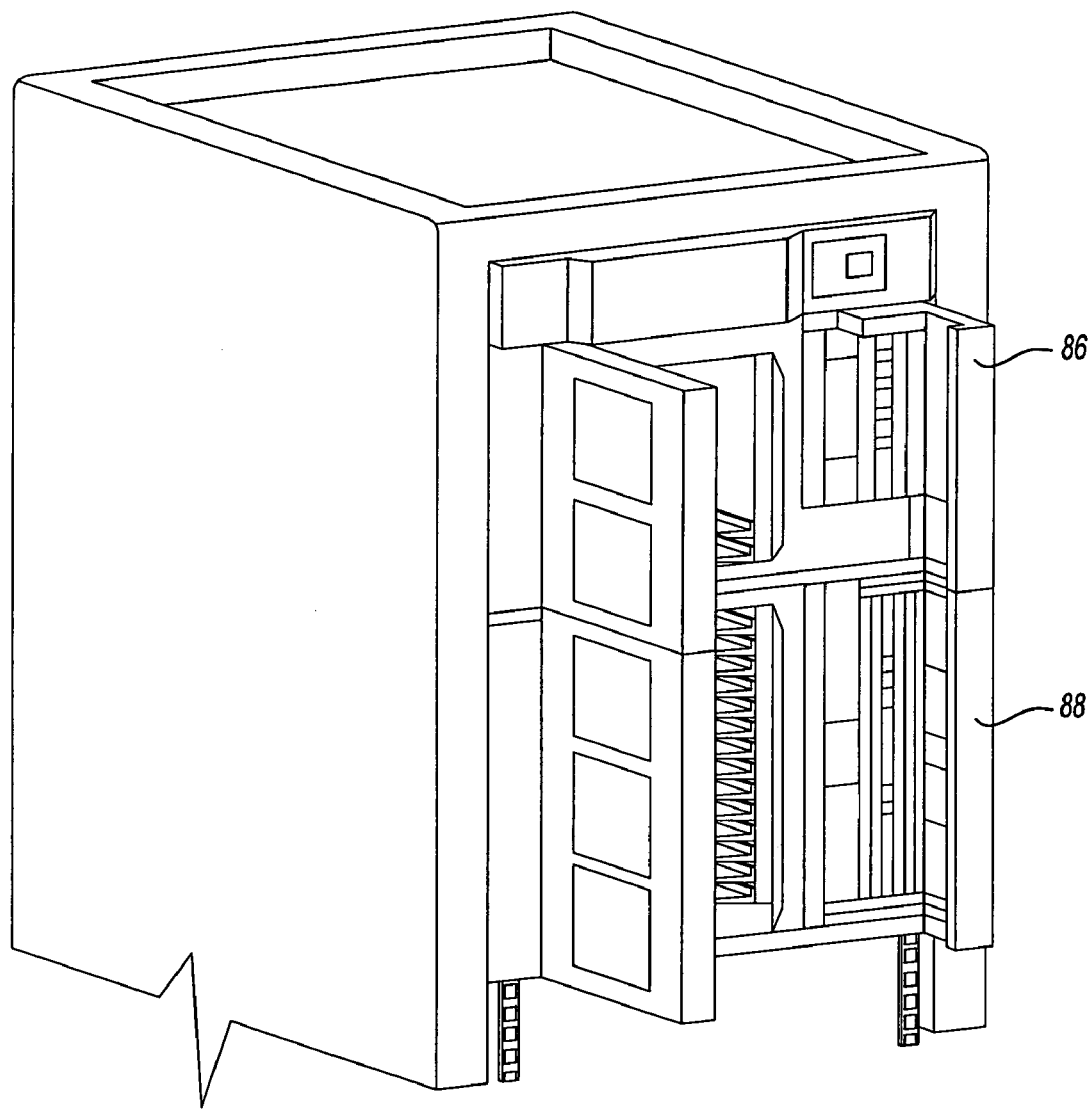
FIG. 21 is a fragmentary front perspective view showing a base unit with an expansion unit assembled to the base unit in the rack.

Referring to FIG. 21, additional detail regarding a base unit customer access port door 86 and an expansion unit customer access port door 88 is provided. The customer access port doors 86 and 88 may be removed.

Figure 22:
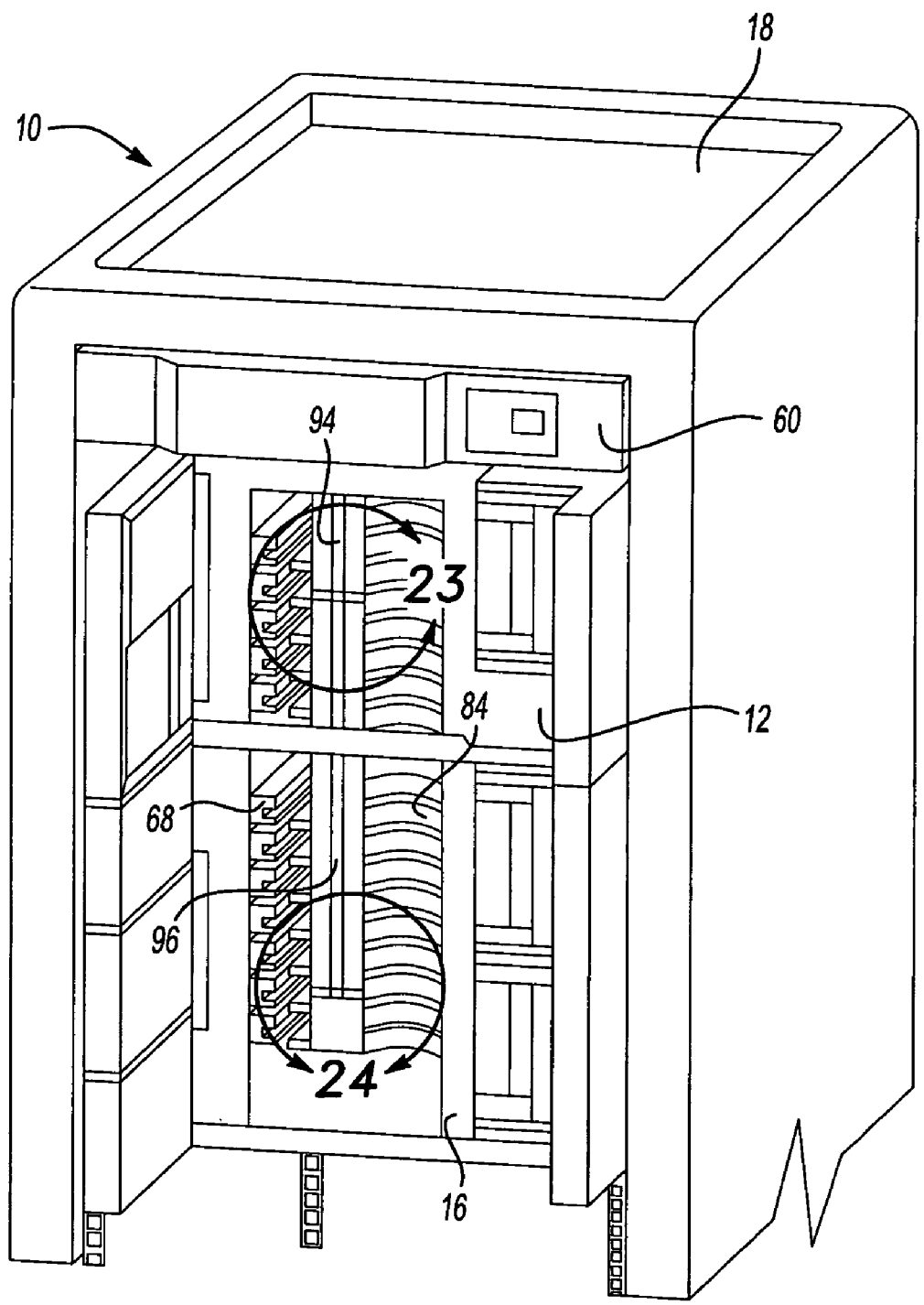
FIG. 22 is a fragmentary perspective view showing a base unit and expansion module with the front doors open to show the guide rail for the robotic system and the supplemental guide rail of the expansion unit.
Figure 23:
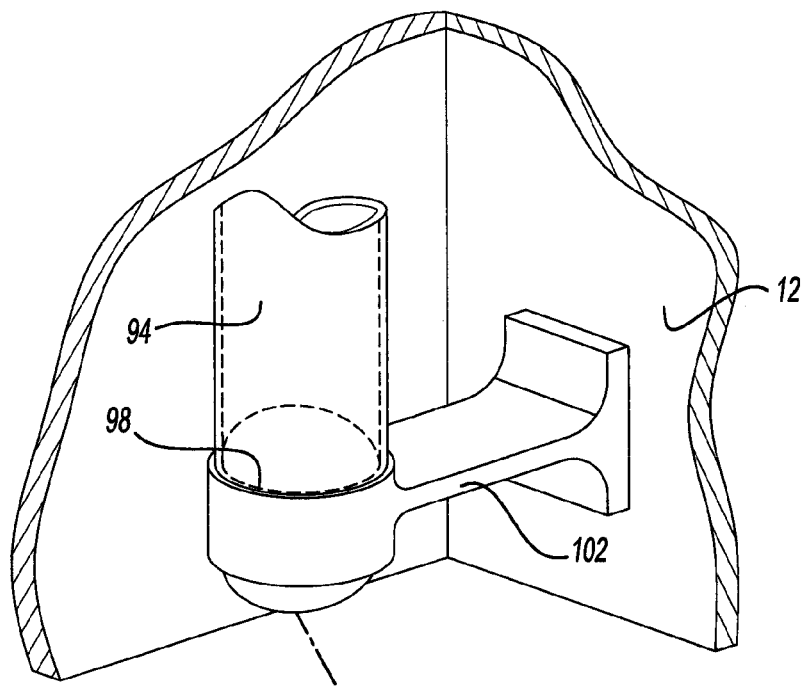
FIGS. 23 and 24 are magnified views showing the guide rail and the expansion guide rail as they are connected by a guide rail bracket.
Figure 24:
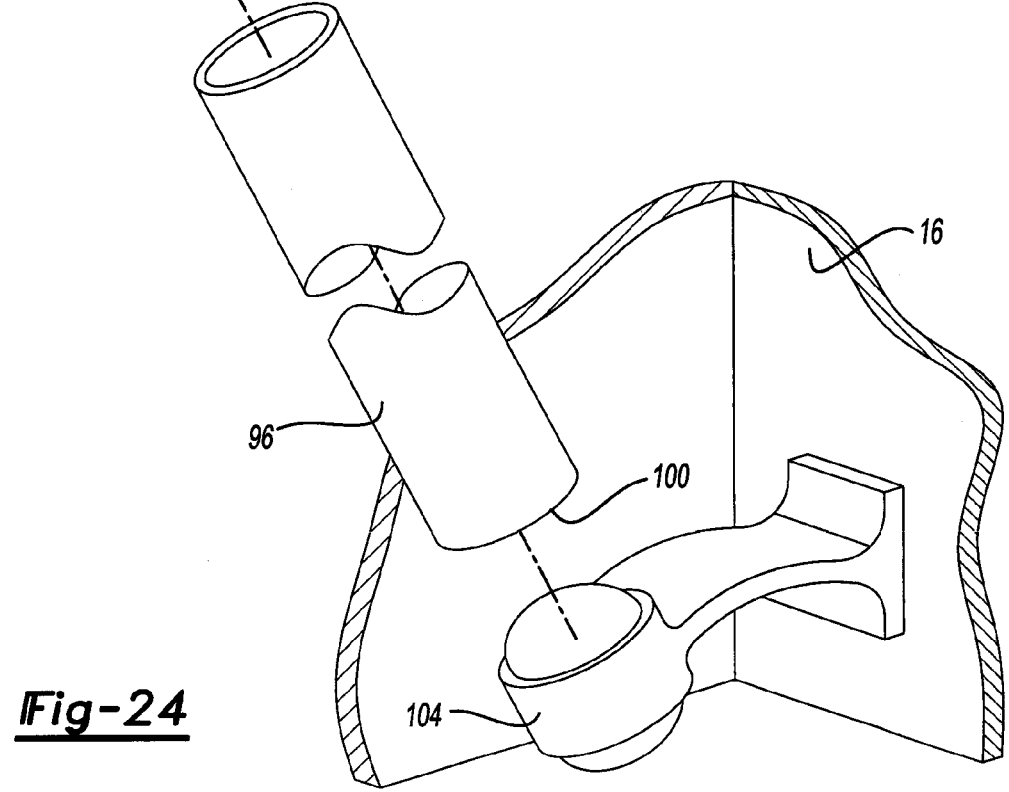

Referring to FIGS. 22-24, a Z pole guide 94 and an expansion guide pole 96 are assembled together to provide a continuous guide for the robotic system 18. The Z pole guide 94 has an upper Z pole mount 98 on its lower end. A lower Z pole mount 100 is provided on the lower end of expansion guide pole 96. A flexible bracket 102 engages upper Z pole mount 98 on the lower end of the Z pole guide 94. The bracket 102 also engages the upper end of guide pole 96 while the lower end of guide pole 96 is retained by another bracket 104.

Expansion unit 16 is electrically connected to the base unit 12 by cables that permit communication between the expansion unit 16 and the base unit 12. Instead of providing conventional cables, integral connectors may be provided on the upper and lower surfaces of the expansion unit and base unit, respectively, to permit communication through direct connection between connectors formed on the expansion unit 16 and base unit 12.

While the addition of a single expansion unit 16 has been described, it should be understood that additional expansion units, as shown in FIG. 1, may be stacked below the base unit 12 by repeating the installation process step described with regard to assembling the expansion unit 16 to the base unit 12. Additional expansion units 16 are assembled to upwardly adjacent expansion unit 16 in the same manner as the first expansion unit 16 is secured to the base unit 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An expandable storage library for removable data storage articles, comprising:
   a rack;
   a base unit assembled to the rack, the base unit including an enclosure, at least one media drive, a data storage article rack, a robotic system for storing and accessing a plurality of data storage articles in the data storage article rack, and a processor for controlling the robotic system that records the storage locations of the data storage articles in the data storage article rack for subsequent retrieval;
   an expansion module having a supplemental media rack that is assembled to the enclosure by sliding the module onto at least one guide rail on the rack and without further disassembly of the enclosure;
   a door on the enclosure and a supplemental door on the module that is assembled to the door on the enclosure when the expansion module is assembled to the base unit, a first engagement feature on the door and a second engagement feature on the supplemental door, wherein the first and second engagement features are engaged to join the supplemental door to the door; and an interface between the expansion module and the base unit that enables the robotic system and processor to store and retrieve data storage articles that may be stored in the data storage article rack or supplemental data storage article rack.

2. The expandable storage library of claim 1 wherein a removable panel is removed from a vertically facing wall of the enclosure.

3. The expandable storage library of claim 2 wherein the removable panel is a floor panel of the base unit, the floor panel is assembled to the expansion module on a bottom side of the expansion module.

4. The expandable storage library of claim 1 wherein the expansion module has an open side on the side of the expansion module facing away from the base unit and wherein the removable panel is removed from the base unit and assembled to the open side of the expansion module.

5. An expandable storage library for removable data storage articles, comprising:
   a rack;
   a base unit installed in the rack, the base unit having a base enclosure, at least one media drive, a data storage rack, a robotic system for storing and accessing a plurality of data storage articles in the data storage rack, a processor for controlling the robotic system that records the storage location of the data storage articles in the data storage article rack for subsequent retrieval, and a first engagement feature on the base unit;
   an expansion module having a supplemental media rack that is assembled to an expansion enclosure, wherein the expansion module slides into engagement with the base unit, and wherein a second engagement feature is provided on the expansion unit, wherein the first and second engagement features are engaged to horizontally align the expansion unit with the base unit as the expansion unit slides into engagement with the base unit;
   a base guide rail in the base unit that guides the robotic system as it moves vertically within the base unit, and an expansion guide rail that guides the robotic system as it moves vertically within the expansion module, wherein the base guide rail and the expansion guide rail are joined together by a bracket that engages a bottom end of the base guide rail and a top end of the expansion guide rail, and wherein the base unit guide rail and expansion unit guide rail are hollow tubular members and the expansion bracket has a semi-spherical top portion on a top end that is received by the base guide rail and a semi-spherical bottom portion on a bottom end that is received by the expansion guide rail; and
   an interface between the expansion module and the base unit that enables the robotic system and processor to store and retrieve data storage articles that may be stored in the data storage article rack or supplemental media rack.

6. The expandable storage library of claim 5 wherein the expansion bracket is a flexible member.

7. An expandable storage library for removable data storage articles, comprising:
   a rack;
   a base unit installed in the rack, the base unit having a base enclosure, at least one media drive, a data storage rack, a robotic system for storing and accessing a plurality of data storage articles in the data storage rack, a processor for controlling the robotic system that records the storage location of the data storage articles in the data storage article rack for subsequent retrieval, and a first engagement feature on the base unit;
   an expansion module having a supplemental media rack that is assembled to an expansion enclosure, wherein the expansion enclosure is supported by at least one set of side rails that are secured to a set of front tracks and at least one set of rear support brackets that are secured to a set of rear tracks, the rear support brackets each having a receptacle for receiving the side rails in a range of locations, and wherein the expansion module slides into engagement with the base unit, and wherein a second engagement feature is provided on the expansion unit, wherein the first and second engagement features are engaged to horizontally align the expansion unit with the base unit as the expansion unit slides into engagement with the base unit; and
   an interface between the expansion module and the base unit that enables the robotic system and processor to store and retrieve data storage articles that may be stored in the data storage article rack or supplemental data storage article rack.

* * * * *